United States Patent
Baer et al.

(10) Patent No.: US 7,323,112 B2
(45) Date of Patent: Jan. 29, 2008

(54) METHOD OF FABRICATING ELECTRONIC COMPONENT USING RESIST STRUCTURE WITH NO UNDERCUT

(75) Inventors: Amanda Baer, Campbell, CA (US); Marie-Claire Cyrille, San Jose, CA (US); Frederick Hayes Dill, South Salem, NY (US); Wipul Pemsiri Jayaekara, Los Gatos, CA (US); Jui-Lung Li, San Jose, CA (US); Hugo Alberto Emilio Santini, San Jose, CA (US); Benjamin Lu Chen Wang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 300 days.

(21) Appl. No.: 10/652,053

(22) Filed: Aug. 29, 2003

(65) Prior Publication Data

US 2005/0045580 A1 Mar. 3, 2005

(51) Int. Cl.
*B44C 1/22* (2006.01)
(52) U.S. Cl. .................................................. 216/22
(58) Field of Classification Search .............. 216/24; 438/3
See application file for complete search history.

(56) References Cited

U.S. PATENT DOCUMENTS

| | | | |
|---|---|---|---|
| 5,892,641 A | 4/1999 | Ishiwata | 360/113 |
| 6,329,211 B1* | 12/2001 | Terunuma et al. | 438/3 |
| 6,423,240 B1 | 7/2002 | Wang et al. | 216/22 |
| 6,444,406 B1 | 9/2002 | Ito et al. | 430/320 |
| 6,723,252 B1* | 4/2004 | Hsiao et al. | 216/22 |
| 2002/0011460 A1* | 1/2002 | Seigler et al. | 216/22 |

FOREIGN PATENT DOCUMENTS

JP 2001028364 1/2001

OTHER PUBLICATIONS

Office Action from U.S. Appl. No. 11/200,757 mailed Jun. 4, 2007.

* cited by examiner

*Primary Examiner*—Roberts Culbert
(74) *Attorney, Agent, or Firm*—Zilka-Kotab, PC (57) ABSTRACT

A method for milling a structure. A single- or multi-layer resist having no undercut is added to a surface of a structure to be milled, the surface to be milled defining a plane. A milling process, such as ion milling, is performed. The milling process includes milling the structure at high incidence and milling the structure at razing incidence. The milling process can be performed only once, or repeated multiple times. High incidence can be defined as about 65 to about 90 degrees from the plane of the surface being milled. Razing incidence can be defined as about 0 to about 30 degrees from the plane of the surface being milled.

20 Claims, 6 Drawing Sheets

METHOD OF FABRICATING ELECTRONIC COMPONENT USING RESIST STRUCTURE WITH NO UNDERCUT

FIELD OF THE INVENTION

The present invention relates to fabrication of electronic components, and more particularly, this invention relates to forming an electronic component using a resist system with no undercut and milling at different incidence angles.

BACKGROUND OF THE INVENTION

One well known way to increase the performance of hard disk drives is to increase the areal data storage density of the magnetic hard disk. This can be accomplished by reducing the written data track width, such that more tracks per inch can be written on the disk. To read data from a disk with a reduced track width, it is also necessary to develop sufficiently narrow read head components, such that unwanted magnetic field interference from adjacent data tracks is substantially eliminated.

Figure 1:
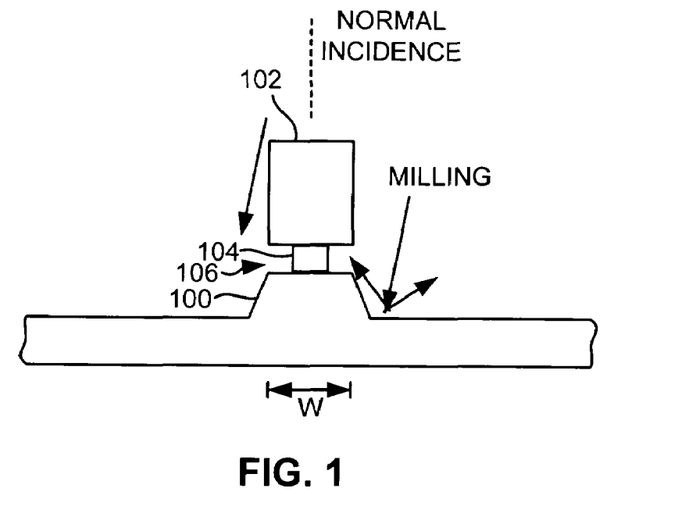
FIG. 1 is a partial side view of a dual layer photoresist (with undercut) milling process.

The ability to develop and deliver sub 130 nm trackwidth read sensors critically depends upon the ability to ion mill the sensor and to reliably lift-off the deposited stabilization (hard magnet) and lead materials. As shown in FIG. 1, the ion mill used in manufacturing for trackwidth or stripe height definition of a sensor 100 uses a single mill step at high incidence angle (0 to 15 degrees from normal incidence, i.e., perpendicular to the plane of the surface being milled). State of the art manufacturing processes require a photoresist bilayer 102, which defines the milling. The bottom layer 104 of the photoresist bilayer 102 is undercut to a finer dimension than the trackwidth W. This undercut prevents material from redepositing on top of the track during the ion mill step and is critical for the lift off process. The high incidence milling usually creates sharp mill profiles and if a bilayer photoresist is used, redeposited metal from milling accumulates in the undercut 106 and is removed during lift-off. No redeposited material remains at the junction edge.

However, as the sensor trackwidths have decreased with product and technology roadmaps, the bilayer resist process has reached its limits. It cannot be performed reliably for trackwidths below 130 nm, mainly because the width of the photoresist underlayer becomes too small to support the overlayer. One solution is to use a resist structure without undercut. Such structure can be a single layer resist or a multilayer provided that no undercut is formed. In the case of a multilayer, the resist image can be patterned by lithography or dry etching techniques such as ion mill, reactive ion etching (RIE), etc. Using a single layer photoresist is advantageous because only one photoresist image must be controlled and reliable lift-off can still be performed using chemical-mechanical polishing (CMP) based lift-off. Particularly, by using a single layer photoresist, no undercut is formed, resulting in a stable photoresist structure. Further, the photoresist and much of the redeposited material coupled to it can be easily removed.

While using a single layer photoresist (without undercut) milled at high incidence, the milling profile is sharper but redeposited metal from the mill accumulates on the resist side walls and also on the side walls of the structure being milled, such as a sensor. Elemental analysis of the junction side has shown that sensor material and alumina (from gap) are redeposited. This unwanted material creates a large physical separation between the read sensor and its stabilization (HB) layer, resulting in increased sensor resistance and poor magnetic stability.

Figure 2:
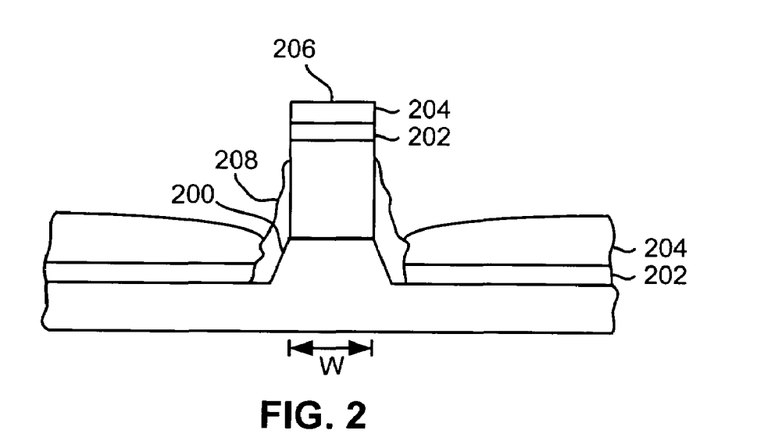
FIG. 2 is a partial side view of a milling process using a photoresist structure having no undercut.

Referring to FIG. 2, in a typical process, after milling to form the sensor 200, a thick seed layer (e.g., Cr or other suitable material) 202 is formed, and then a HB layer 204 is formed over the seed layer. The single layer photoresist 206 can form the mask for deposition of the seed and HB layers. What is important for magnetic properties of a sensor is the distance between the free layer and the HB layer. Ideally, the HB layer 204 and free layer of the sensor 200 are aligned, but if the separation between the HB and free layers is too large, the HB layer 204 will not form a magnetic junction with the free layer. Milled material 208 redeposited on the sides of the sensor increases the separation between the free layer and the HB layer 204. The increased separation translates into free layer instability. Note also that the thicker the sensor 200 is going to be, the thicker the residual material 208 that forms, compounding the problem. Thus, it would be desirable to remove a majority of the redeposited material from the sensor sidewalls inherently formed in a single layer photoresist milling process.

Figure 3:
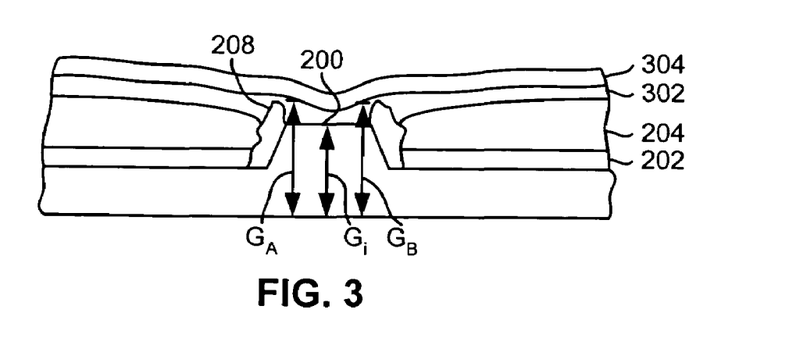
FIG. 3 is a partial side view of the structure of FIG. 2 upon milling and removal of the photoresist.

In addition, when liftoff is performed, residual material (fencing) 208 remains on the wafer surface. FIG. 3 illustrates the structure of FIG. 2 after liftoff of the photoresist 206. Because the component will typically be covered with another material, the fencing can create shorts. For example, if a magnetic sensor is being formed, a dielectric gap layer 302 is placed on top of the wafer, and a shield layer 304 (e.g., a metal such as NiFe, etc.) is added above the gap layer 302. A typical gap layer 302 is only about 150 Å thick, and will be very thin or nonexistent along the peaks of the fencing. The result is that current passes from the sensor 200 via the fencing through the thin gap layer 302 to the shield layer 304, causing a short. Thus, it would be desirable to reduce fencing formed during a single layer photoresist milling process.

Another problem is that fencing causes a flaring of the gap. The gap is the distance between the shield layers. As known to those skilled in the art, the perfect gap $G_i$ is of a predetermined thickness. The actual magnetic track width of the sensor height is much larger than the physical track width because the fencing adds to the gap (now $G_i$, $G_A$, $G_B$), making it uneven (see FIG. 3). The result is that the sensor has a much different magnetic proportion than the design ideals, leading to inferior performance. Thus, it would be desirable to reduce flaring formed during a milling process using a resist structure without undercut.

SUMMARY OF THE INVENTION

The present invention overcomes the drawbacks and limitations described above by providing a method for milling a structure. A layer of resist (i.e., a resist structure having a single layer, bi-layer, tri-layer, etc. of resist material) is added to a surface of a structure to be milled such that the resist structure has no undercut, the surface to be milled defining a plane. A milling process, such as ion milling, is performed. The milling process includes milling the structure at high incidence and milling the structure at razing incidence. The milling process can be performed only once, or repeated multiple times.

High incidence can be defined as in the range of about 65 to about 90 degrees from the top plane of the surface being milled, and preferably about 70 to about 90 degrees from the top plane of the surface being milled. Razing incidence can be defined as in the range of about 0 to about 30 degrees from the plane of the surface being milled. Preferably, a ratio of an amount of time spent milling at razing incidence to an amount of time spent milling at high incidence is between about 0.3 and about 2.

In one embodiment, the structure is milled only at high incidence and razing incidence. In another embodiment, the structure is milled continuously between high incidence and razing incidence, i.e., the milling angle is pivoted between high and razing incidence. In yet another embodiment, the structure is milled at high incidence, at razing incidence, and at a third incidence between high and razing incidence.

Additional processing steps may also be performed, such as to form an electronic component such as a magnetic sensor.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 4:
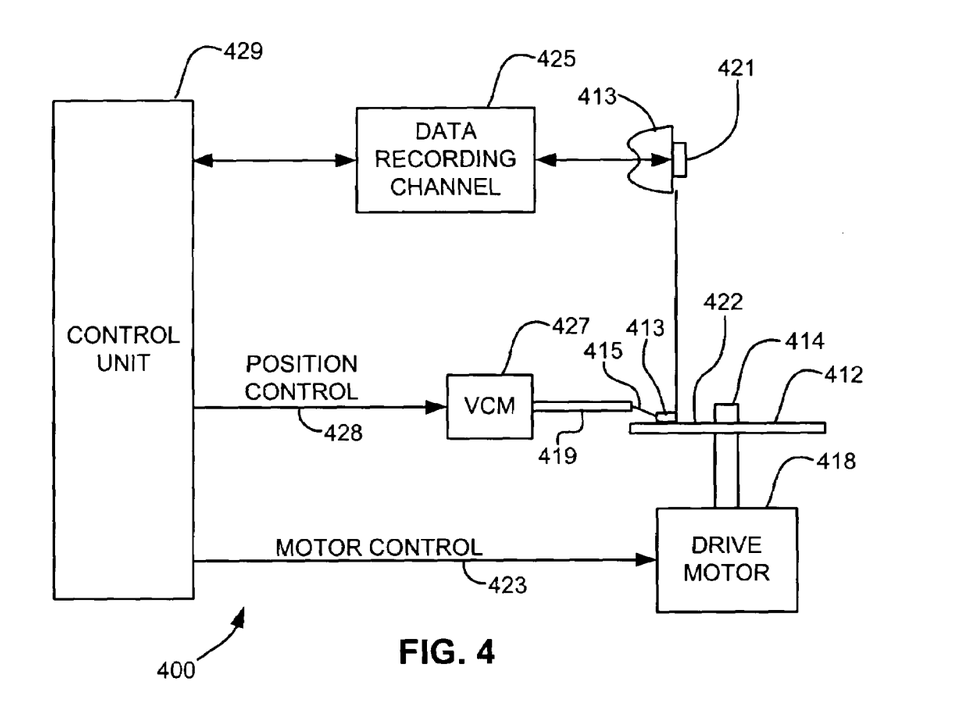
FIG. 4 is a perspective drawing of a magnetic disk drive system in accordance with one embodiment.

Referring now to FIG. 4, there is shown a disk drive 400 embodying the present invention. As shown in FIG. 4, at least one rotatable magnetic disk 412 is supported on a spindle 414 and rotated by a disk drive motor 418. The magnetic recording media on each disk is in the form of an annular pattern of concentric data tracks (not shown) on disk 412.

At least one slider 413 is positioned adjacent to the disk 412, each slider 413 supporting one or more magnetic read/write heads 421. More information regarding such heads 421 will be set forth hereinafter during reference to the remaining FIGS. As the disks rotate, slider 413 is moved radially in and out over disk surface 422 so that heads 421 may access different tracks of the disk where desired data are recorded. Each slider 413 is attached to an actuator arm 419 by way of a suspension 415. The suspension 415 provides a slight spring force which biases slider 413 against the disk surface 422. Each actuator arm 419 is attached to an actuator means 427. The actuator means 427 as shown in FIG. 4 may be a voice coil motor (VCM). The VCM comprises a coil movable within a fixed magnetic field, the direction and speed of the coil movements being controlled by the motor current signals supplied by controller 429.

During operation of the disk storage system, the rotation of disk 412 generates an air bearing between slider 413 and disk surface 422 which exerts an upward force or lift on the slider. The air bearing thus counter-balances the slight spring force of suspension 415 and supports slider 413 off and slightly above the disk surface by a small, substantially constant spacing during normal operation.

The various components of the disk storage system are controlled in operation by control signals generated by control unit 429, such as access control signals and internal clock signals. Typically, control unit 429 comprises logic control circuits, storage means and a microprocessor. The control unit 429 generates control signals to control various system operations such as drive motor control signals on line 423 and head position and seek control signals on line 428. The control signals on line 428 provide the desired current profiles to optimally move and position slider 413 to the desired data track on disk 412. Read and write signals are communicated to and from read/write heads 421 by way of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

The present invention is an improved milling process that removes the material redeposited on the structure being milled while creating very sharp milling profiles. In brief, the method includes ion milling first at high incidence (about 0-25 degrees from normal incidence), then introduce a milling step at razing incidence (about 60-85 degrees from normal incidence) after the high incidence mill step to remove redeposited material at the junction side. The ratio of milling at razing incidence to milling at high incidence (% ratio of low to high angle mill time) necessary to remove the redeposited material can vary from about 30-200%. The milling operation is best when performed in several mill/clean cycles to minimize formation of redeposited material as well as to minimize gap consumption.

The invention allows the use of a photoresist structure having no undercut for the creation of MR read sensors. The main advantages are first a sharp mill profile and second it allows the physical separation between the free layer and its stabilization to be tuned by the cleaning ratio. Both advantages are key to obtain a good alignment and minimal lateral separation between the sensor free layer and its stabilization layer, both being crucial for the magnetic performance (amplitude and stability) of read sensors.

The same principles apply to the stripe height definition of read sensors if one uses a resist system without undercut.

Figure 5:
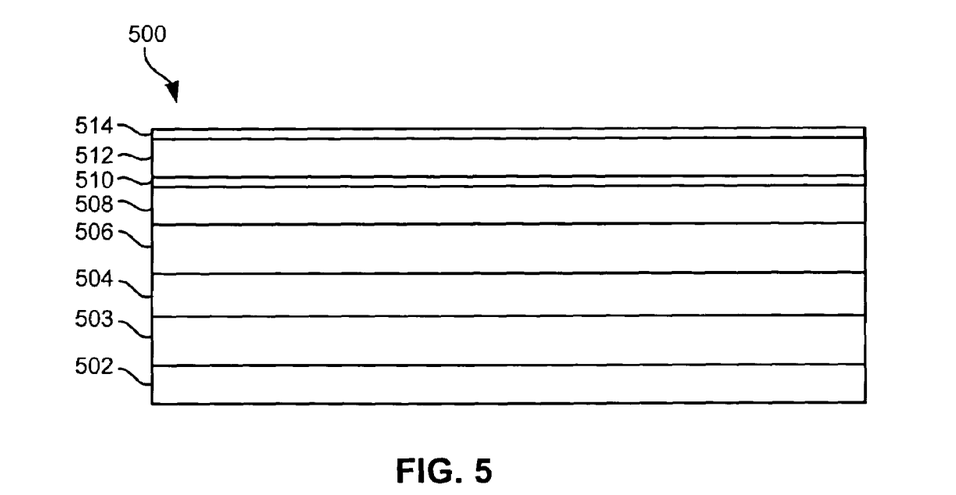
FIG. 5 illustrates a wafer stack according to one embodiment.

FIG. 5 illustrates a partial wafer stack 500 formed during a process for creating a magnetic sensor. As shown, the wafer stack 500 includes a first magnetic shield 502, typically of NiFe, fabricated on a substrate (not shown). A dielectric first gap layer 503 is formed on the first magnetic shield 502. A seed layer 504 is deposited upon the first gap layer 503 and a series of thin film layers are sequentially deposited upon the seed layer 504 to form a GMR read head. In an illustrative embodiment of the present invention, the layers generally include an antiferromagnetic layer 506, a lower pinned layer 508, a first spacer layer 510, a free magnetic layer 512 that is deposited upon the first spacer layer 510, and a cap layer 514. The first spacer layer 510 may include Cu, Ru, etc. and the free layer 512 may include CoFe, NiFe, FeN, Co, etc. The cap layer 514 may include Ta. Note that this structure is strictly for illustration only, and one skilled in the art will appreciate that sensor structures can vary dramatically from the one shown in FIG. 5, the methodology of the present invention being applicable to formation of all such heads.

Figure 6:
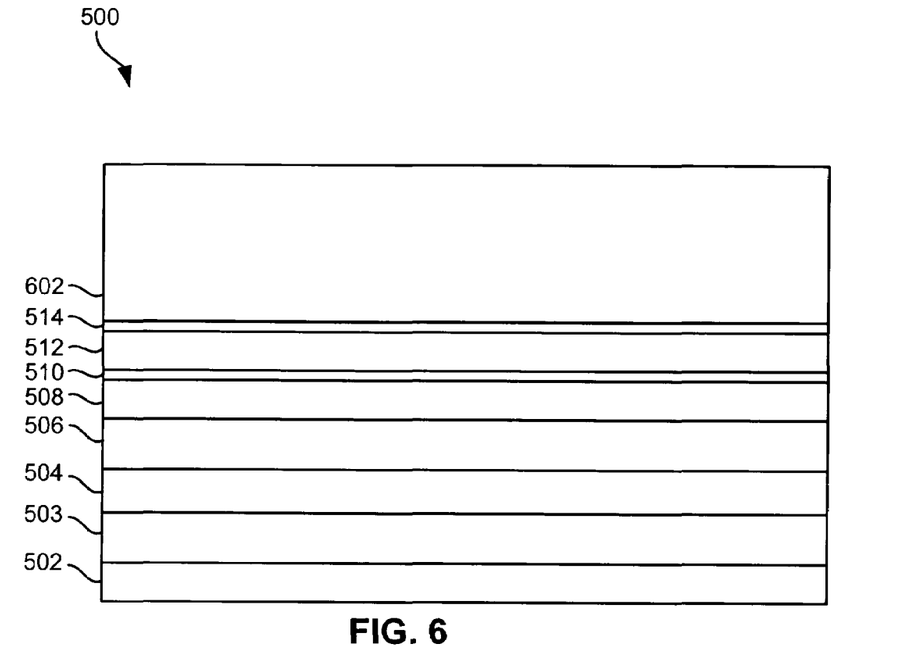
FIG. 6 illustrates the wafer stack of FIG. 5 after the addition of photoresist.

As shown in FIG. 6, a layer of photoresist 602 is applied to the wafer stack 500. One resist that can be used is polymethylglutarimide (PMGI) available from MicroChem Corp., 1254 Chestnut Street, Newton, Mass. 02464, USA. Other suitable resists include i-line, deep UV, Duramide, and e-beam resists. Note that the layer of photoresist 602 may be formed of a single layer, a bi-layer, a tri-layer, etc. of one or more resist materials. Again, the resist structure would not have an undercut, meaning that the width of the resist after patterning would have be substantially linear from top to bottom.

Figure 7:
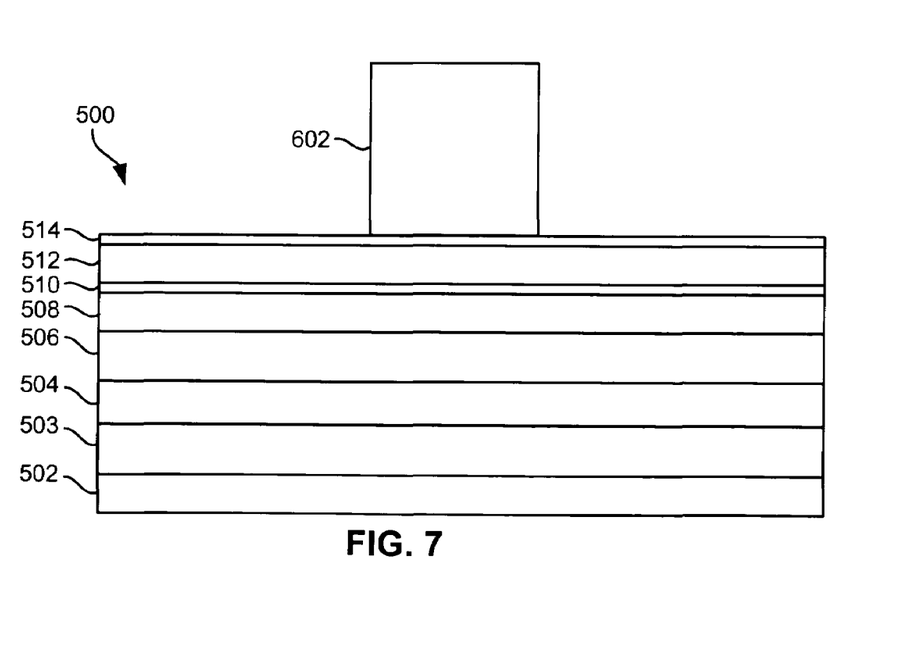
FIG. 7 illustrates the wafer stack of FIG. 6 after removal of side regions of the photoresist.

Material is removed from the layer of resist 602, as shown in FIG. 7. Any suitable process, such as photolithograpy or reactive ion etching (RIE), can be used to remove the side regions of the resist 602.

Figure 8:
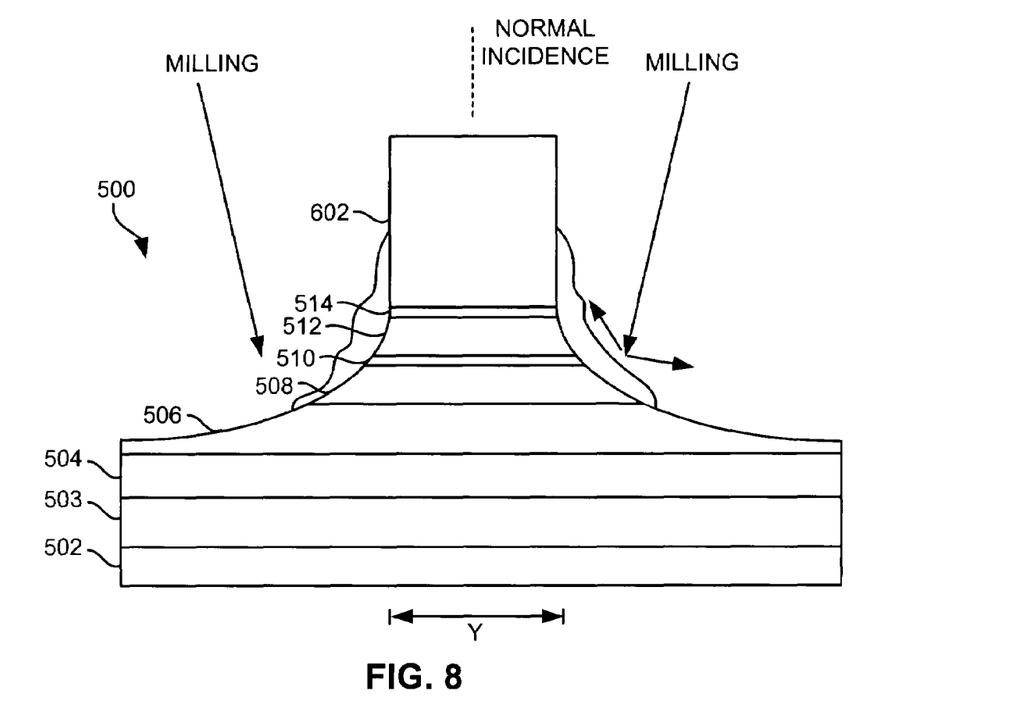
FIG. 8 illustrates the wafer stack of FIG. 7 upon being milled at high incidence.
Figure 9:
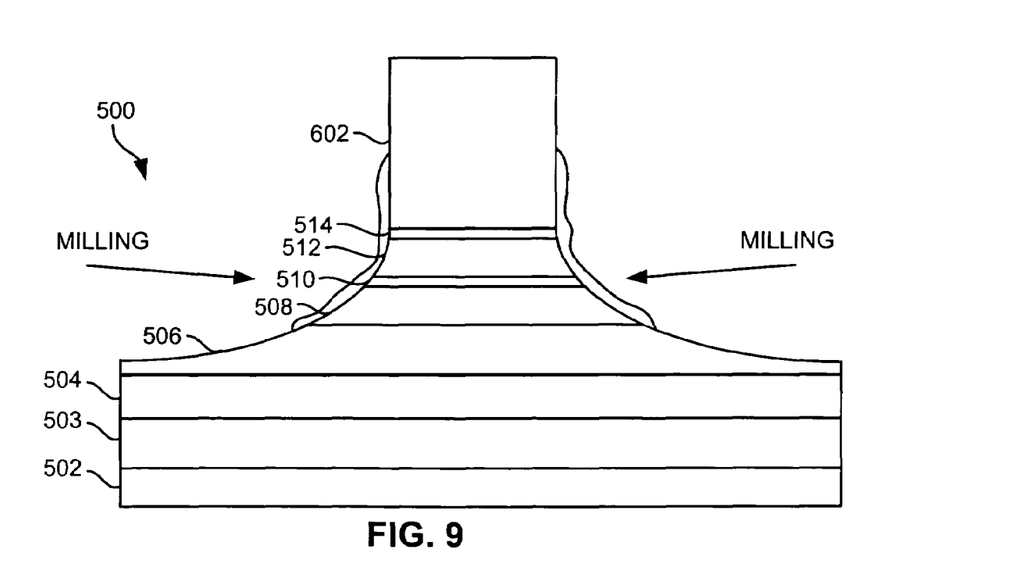
FIG. 9 illustrates the wafer stack of FIG. 8 upon being milled at razing incidence.

As shown in FIG. 8, the resist 602 is used as a mask of width Y for ion milling/RIE or sputter etching to remove side areas 802 of the wafer stack 500. To obtain a profile of the wafer stack 500 which is straight (relatively vertical), milling must be performed at high incidence, i.e., about 0-25 degrees from normal incidence, preferably about 0-15 degrees, from normal incidence; (or about 65-90 degrees, preferably about 75-90 degrees from the surface being milled). However, this causes redeposition of material 804, as discussed in detail above. To remove the redeposited material 804, the wafer stack 500 is milled at razing incidence, i.e., about 60-90 degrees from normal incidence, preferably about 60-85 degrees from normal incidence, as shown in FIG. 9.

These angles provide a milling rate that reduces the top of the wafer stack 500 faster than the side of the wafer stack 500. This is because the top is milled at less than about 25 degrees, with a small amount of the milling affecting the sides. At razing incidence, both the top and sides of the wafer stack 500 are milled, with more milling at the sides of the wafer stack 500.

Ideally, alternating milling cycles are performed at normal and razing incidence, or with the milling angle being pivoted between normal and razing incidence. Optionally, milling can be performed at additional angles between normal and razing incidence. Preferably, a ratio of an amount of time spent milling at razing incidence to an amount of time spent milling at high incidence is between about 0.3 and about 2.

Figure 10:
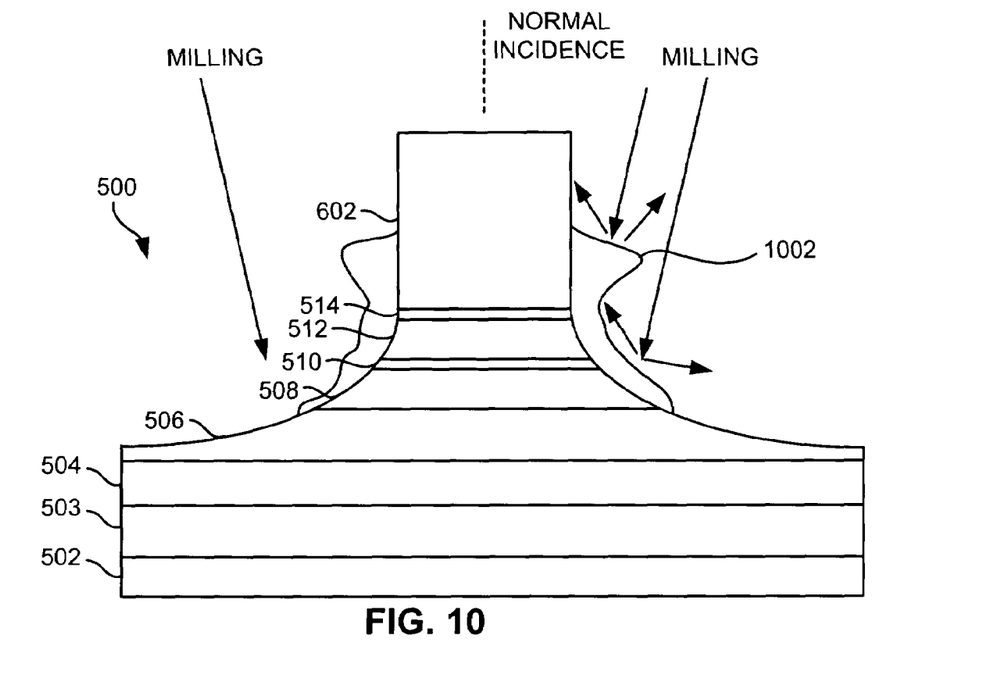
FIG. 10 illustrates a wafer stack with insufficient milling at milling at razing incidence.

The more cycles that can be performed, the better the cleaning effect of the milling at razing incidence. Many alternating cycles are preferred, because redeposited material may build up to create a protrusion 1002 that causes shadowing, causing the milling to be performed outside the ideal plane and not under the protrusion 1002, as shown in FIG. 10.

Figure 11:
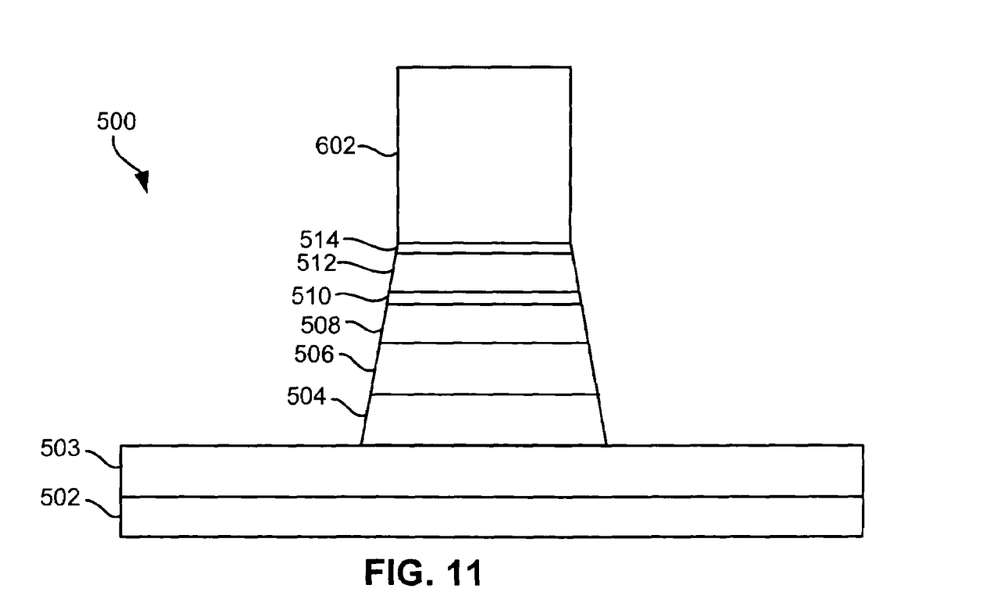
FIG. 11 illustrates the wafer stack of FIG. 9 after milling.

The structure of FIG. 9 after all milling has been completed is shown in FIG. 11.

Figure 12:
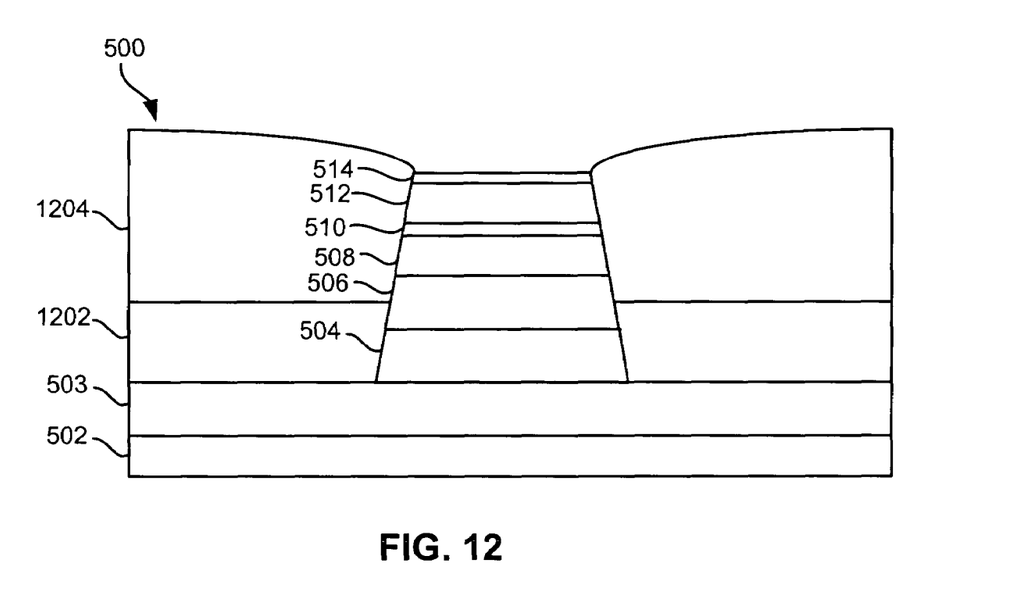
FIG. 12 illustrates the wafer stack of FIG. 11 upon addition of hard bias material.

Referring to FIG. 12, a seedlayer 1202 of a suitable material such as Cr, etc. and a hard bias layer 1204 are added to the wafer stack 500 using any suitable process, such as deposition. Then a lift off process is used to remove the resist 602, leaving the wafer stack 500 shown in FIG. 12. The hard bias layer 1204 may include CoFe, NiFe, FeN, Co, CoPt, CoPtCr, etc.

Additional layers may be added to the wafer stack 500, such as an upper shield layer (not shown), layers of dielectric material (not shown), and leads (not shown). Optionally, a layer of carbon (not shown) can be added if subsequent processing includes CMP. The carbon will protect the formed sensor from damage during the CMP. For example, the layer of carbon can be added, and the carbon shaped by reactive ion etching (RIE).

While various embodiments have been described above, it should be understood that they have been presented by way of example only, and not limitation. For example, the structures and methodologies presented herein are generic in their application to all semiconductor components including MR heads, AMR heads, GMR heads, TMR heads, CPP GMR heads, etc. Thus, the breadth and scope of a preferred embodiment should not be limited by any of the above-described exemplary embodiments, but should be defined only in accordance with the following claims and their equivalents.

What is claimed is:

1. A method for milling a structure, comprising:
adding a single- or multi-layer photoresist having no undercut to a surface of a structure to be milled, the surface to be milled defining a plane;
performing a continuous milling process on the structure to be milled having the photoresist thereon, the milling process including:
continuously milling the structure between high incidence and razing incidence;
repeating the continuous milling process at least one more time.

2. The method as recited in claim 1, wherein the milling is ion milling.

3. The method as recited in claim 1, wherein high incidence is defined as about 65 to about 90 degrees from the plane of the surface being milled.

4. The method as recited in claim 1, wherein high incidence is defined as about 70 to about 90 degrees from the plane of the surface being milled.

5. The method as recited in claim 1, wherein razing incidence is defined as about 5 to about 30 degrees from the plane of the surface being milled.

6. The method as recited in claim 1, wherein a ratio of an amount of time spent milling at razing incidence to an amount of time spent milling at high incidence is between about 0.3 and about 2.

7. The method as recited in claim 1, wherein the milling process is repeated at least 4 more times.

8. The method as recited in claim 1, wherein the structure is milled only at high incidence and razing incidence.

9. The method as recited in claim 1, wherein high incidence is about 75 to about 90 degrees from the plane of the surface being milled, wherein razing incidence is about 0 to about 30 degrees from the plane of the surface being milled.

10. A method for milling a structure, comprising:
adding a single- or multi-layer photoresist having no undercut to a surface of a structure to be milled, the surface to be milled defining a plane;
performing a multi-step milling process on the structure to be milled having the photoresist thereon, the milling process including:
milling the structure at high incidence;

milling the structure at razing incidence; and repeating the multi-step milling process at least one more time, wherein the structure is milled at high incidence, at razing incidence, and at a third incidence between high and razing incidence.

11. The method as recited in claim 1, wherein the structure is a magnetic sensor.

12. A method for milling a structure, comprising:

adding and patterning a single- or multi-layer resist having no undercut to a surface of a structure to be milled, the upper surface of the structure to be milled defining a continuous exposed plane in an area immediately surrounding a device being formed except for portions of the upper surface located under the resist;

performing a milling process on the structure to be milled having the resist thereon, the milling process including:

milling the structure at high incidence of greater than 65 to about 90 degrees from the plane of the surface being milled; and milling the structure at razing incidence of about 0 to about 30 degrees from the plane of the surface being milled.

13. The method as recited in claim 12, wherein the milling is ion milling.

14. The method as recited in claim 12, wherein high incidence is defined as about 75 to about 90 degrees from the plane of the surface being milled.

15. The method as recited in claim 12, wherein a ratio of an amount of time spent milling at razing incidence to an amount of time spent milling at high incidence is between about 0.3 and about 2.

16. The method as recited in claim 12, wherein the milling process is repeated at least 4 more times.

17. The method as recited in claim 12, wherein the structure is milled only at high incidence and razing incidence.

18. The method as recited in claim 12, wherein the structure is milled continuously between high incidence and razing incidence, and further comprising repeating the continuous milling process at least one more time.

19. The method as recited in claim 12, wherein the structure is milled at high incidence, at razing incidence, and at a third incidence between high and razing incidence.

20. The method as recited in claim 12, wherein the structure is a magnetic sensor.

* * * * *

UNITED STATES PATENT AND TRADEMARK OFFICE
CERTIFICATE OF CORRECTION

PATENT NO. : 7,323,112 B2
APPLICATION NO. : 10/652053
DATED : January 29, 2008
INVENTOR(S) : Amanda Baer et al.

It is certified that error appears in the above-identified patent and that said Letters Patent is hereby corrected as shown below:

On the title page:
    In item (75) – Inventors: change the inventors name from "Jayaekara" to
        --Jayasekara--;

Signed and Sealed this

Thirteenth Day of May, 2008

JON W. DUDAS
*Director of the United States Patent and Trademark Office*